US005897934A

United States Patent [19]

Yeh

[11] Patent Number: 5,897,934

[45] Date of Patent: Apr. 27, 1999

[54] WRITING/READING PANEL WITH HIDDEN INDICATION BAR

[76] Inventor: Morgen Yeh, Chung Cheng North Road, San Chung City, Taipei Hsien, Taiwan

[21] Appl. No.: 08/895,579

[22] Filed: Jul. 16, 1997

[51] Int. Cl.[6] ................................ B32B 3/02; B32B 3/06

[52] U.S. Cl. ............................ 281/45; 248/452; 24/67.3; 428/99

[58] Field of Search .............................. 428/192; 281/45; 248/452, 451; 24/67.3, 67.5, 67.11; 211/45

[56] References Cited

U.S. PATENT DOCUMENTS 5,451,025 9/1995 Hames .................................. 248/452

*Primary Examiner*—Alexander Thomas
*Attorney, Agent, or Firm*—Rosenberg, Klein & Bilker

[57] ABSTRACT

A writing reading/panel with hidden indication bar, including a panel body having a resilient paper clip pivotally disposed on upper side and a slide channel longitudinally disposed on a lateral side, an indication bar snugly fitted in the slide channel at normal time and a connecting member vertically slidably disposed on two sides of the slide channel to embrace the same. The connecting member is disposed with at least one resilient locating plate for abutting against lateral walls of the slide channel so as to locate the connecting member at a desired position on the panel body. In the case that the indication bar is hidden in the slide channel, a paper can be clipped on the panel body for a user to directly write thereon. Alternatively, the indication bar can be taken out of the slide channel and connected with the connecting member, whereby the indication bar can be moved along with the connecting member along the slide channel to indicate the content of the paper clipped on the panel body.

8 Claims, 7 Drawing Sheets

WRITING/READING PANEL WITH HIDDEN INDICATION BAR

BACKGROUND OF THE INVENTION

The present invention relates to a writing/reading panel with hidden indication bar, including a panel body formed with a slide channel in which an indication bar can be snugly fitted at normal time, permitting a user to freely carry the panel body and directly write on a paper clipped thereon. Alternatively, the indication bar can be taken out of the slide channel and connected with the connecting member, whereby the indication bar can be moved along with the connecting member along the slide channel to indicate the content of the paper clipped on the panel body.

During working on a paper such as typing, collation, etc., a reading panel is often used to clip the paper and an indication bar is slidably disposed on a lateral side of the panel for indicating the content of the paper so as to facilitate the reading and avoid missing or mistake.

FIGS. 1 and 2 show an existing reading panel including a panel body 100 and a paper clip 101 resiliently pivotally disposed on the panel body 100. A guide rail 102 is longitudinally formed on a lateral side of the panel body 100 and a connecting member 103 is slidably fitted with the guide rail 102. An indication bar 104 is pivotally connected with the connecting member 103 and attached to the panel face of the panel body 100 for indicating the content of the paper. The upper section of the connecting member 103 is formed with a U-shaped hook section 103*a* for embracing the guide rail 102. The lower section of the connecting member 103 is formed with a resilient clip section 103*b* for resiliently clamping the guide rail 102 so as to stably locate the connecting member 103 as well as the indication bar 104 on the panel body 100. When moving the indication bar 104 up and down, as shown in FIG. 2, the clip section 103*a* must be first compressed and expanded (as shown by the phantom line) to release the guide rail 102, permitting the connecting member 103 as well as the indication bar 104 to be moved up or down to next position. Several shortcomings exist in such structure as follows:

1. When moving the indication bar 104, it is necessary to simultaneously continuously compress the clip section 103*b* of the connecting member 103. Such operation is quite uneasy.

2. When moving the indication bar 104 and compressing the clip section 103*a*, only the upper hook section 103*a* of the connecting member 103 is guided by the guide rail 102 so that the connecting member 103 can be hardly accurately guided through a proper path. When suffereing an outward pulling force, the connecting member 103 is quite apt to detach from the guide rail 102 or the hook section 103*a* tends to be broken.

3. It is impossible to hide the indication bar 104 in the panel body so that the indication bar 104 is always attached to the face of the panel body 100. Therefore, it is impossible to provide a plane panel face for a user to write thereon.

4. When moving the indication bar 104, the clip section 103*b* is continuously compressed. After a long period of use, the clip section 103*b* is subject to wearing and loosening. Therefore, the indication bar 104 can be hardly located at a horizontal position.

5. It is impossible to hide the indication bar 104 in the panel body so that when carried outdoors, the indication bar 104 is apt to drop down and miss or be broken due to collision.

SUMMARY OF THE INVENTION

It is therefore a primary object of the present invention to provide a writing/reading panel with hidden indication bar, including a panel body formed with a slide channel in which an indication bar can be snugly fitted at normal time, permitting a user to freely carry the panel body and directly write on a paper clipped thereon. Alternatively, the indication bar can be taken out of the slide channel and connected with the connecting member, whereby the indication bar can be moved along with the connecting member along the slide channel to indicate the content of the paper clipped on the panel body. The resilient locating plates of the connecting member resiliently abut against the lateral walls of the slide channel, whereby the connecting member can be more smoothly slided without loosening and the indication bar can be kept in a horizontal position. In addition, the resilient locating plates are able to stably locate the connecting member in the slide channel of the panel body so that the connecting member can be freely and quickly located at any position as desired.

The present invention can be best understood through the following description and accompanying drawings, wherein:

DETAILED DESCRIPTION OF THE PREFERRED EMBODIMENTS

Figure 1:
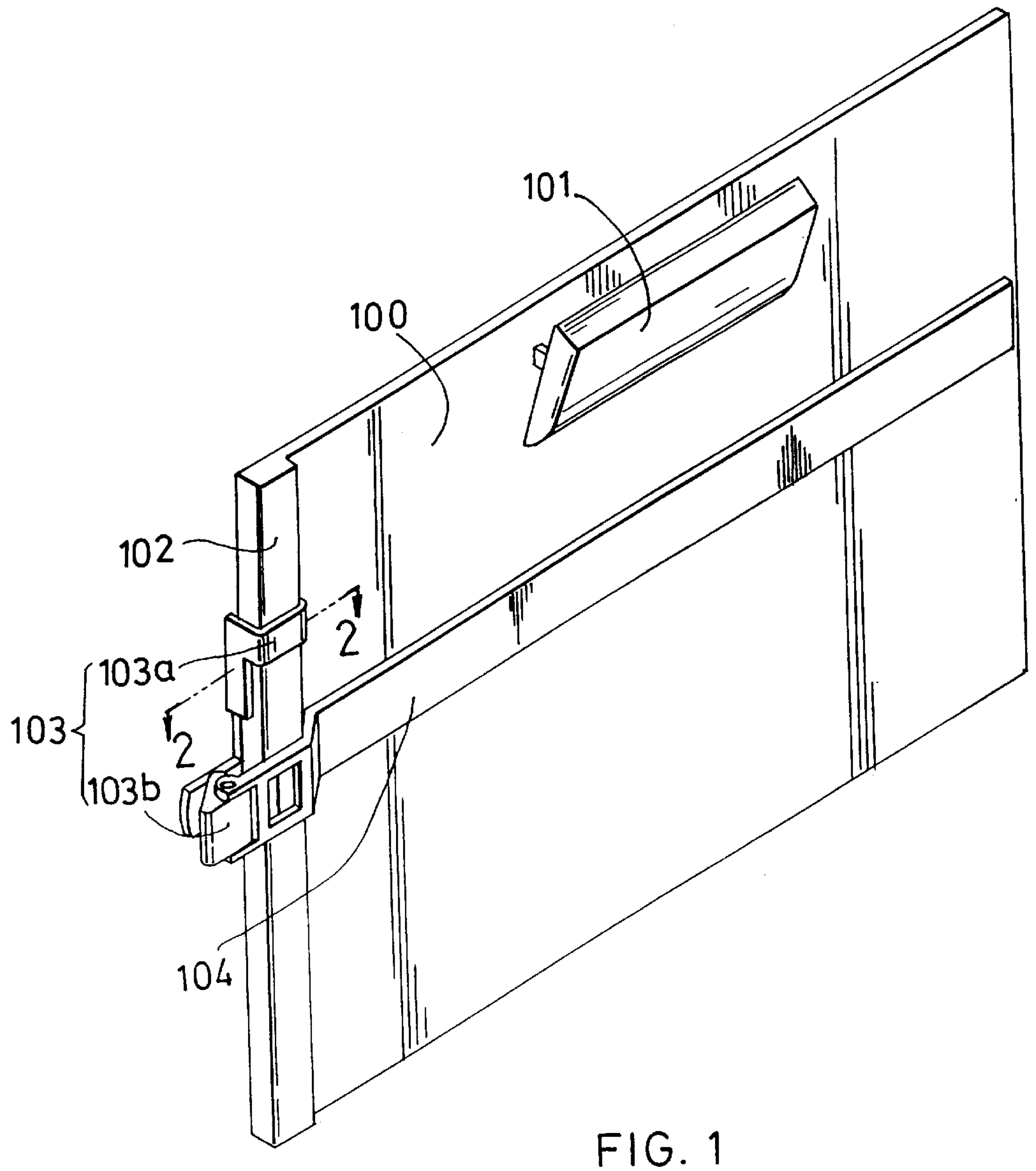
FIG. 1 PRIOR ART
FIG. 1 is a perspective view of a conventional reading panel.
Figure 2:
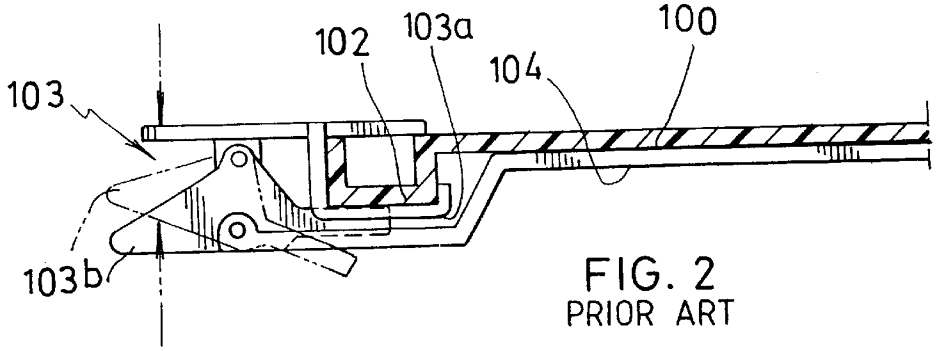
FIG. 2 PRIOR ART
FIG. 2 is a sectional view taken along line 2—2 of FIG. 1.

Please refer to FIGS. 3 to 10. The writing/reading panel of the present invention includes a panel body 1 having a resilient paper clip 11 pivotally disposed on upper side and a slide channel 12 longitudinally disposed on a lateral side of the panel body 1, an indication bar 2 snugly fitted in the slide channel 12 and a connecting member 3 vertically slidably disposed on two sides of the slide channel 12 to embrace the same. The indication bar 2 can be fitted in the slide channel 12, whereby a paper can be clipped by the paper clip 11, permitting the panel body 1 to be used as a writing panel. Alternatively, the indication bar 2 can be connected with the connecting member 3, whereby the indication bar 2 can be vertically moved along with the connecting member 3 along the slide channel 12 of the panel body 1 for indicating the content of the paper clipped on the panel body 1. In this case, the panel body 1 serves as a reading panel.

Figure 3:
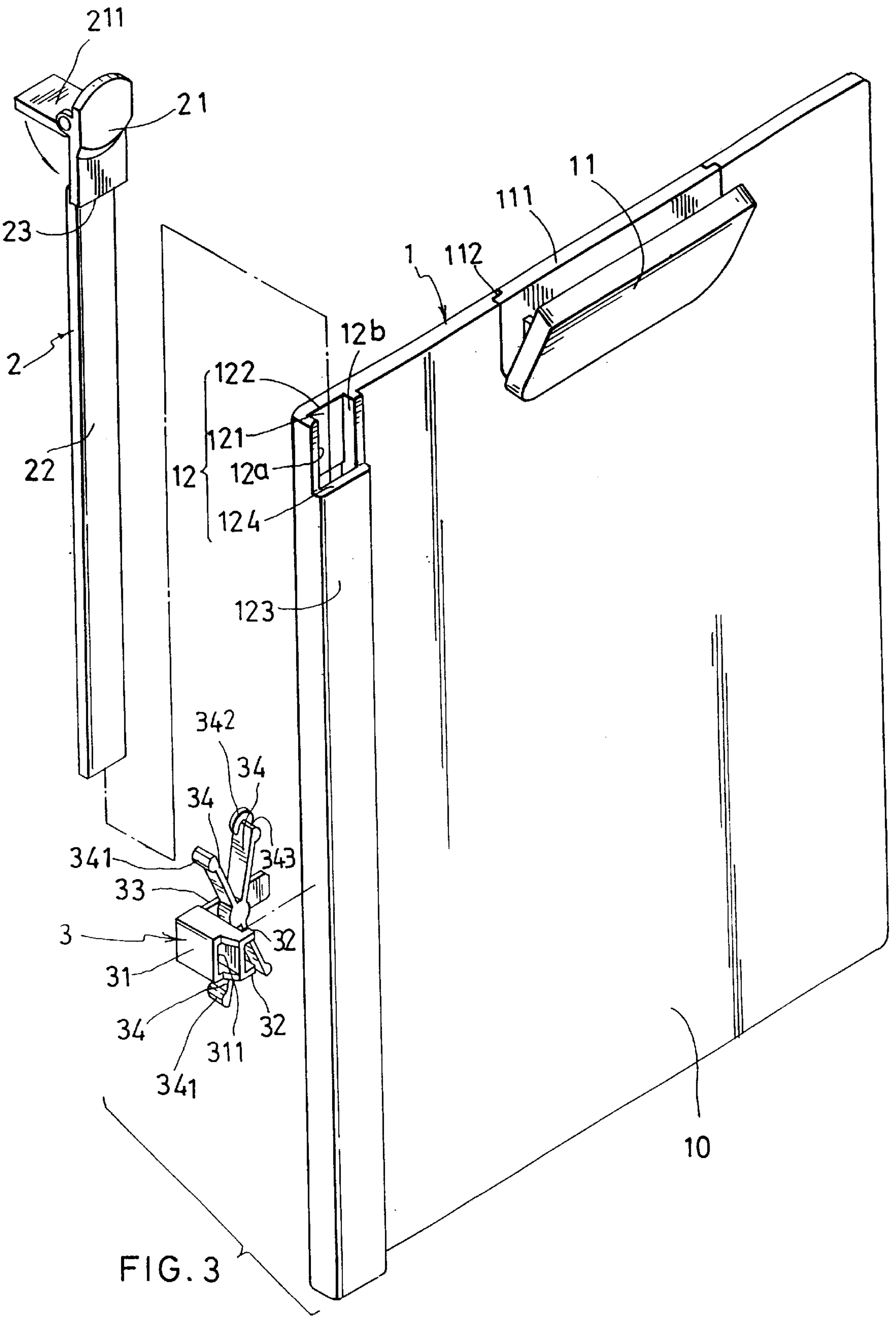
FIG. 3 is a perspective exploded view of the present invention.

The panel body 1 has a plane panel face 10. The paper clip 11 is pivotally disposed on upper side of the panel face 10 for clipping the paper 10*a* on the panel face 10. As shown in FIG. 3, the paper clip 11 can be pivotally disposed on a daughter board 111 which is slidably fitted in a daughter board cavity 112 of the panel body 1, whereby a user can upward pull the daughter board 111 to enlarge the area of the panel face for clipping larger paper.

The slide channel 12 at least has an opening 121 for placing the indication bar 2 into the slide channel 12. A stopper plate 122 is transversely connected between two lateral walls 12*a*, 12*b* of the slide channel 12 at a top section thereof. The stopper plate 122 together with a front wall 123 of the slide channel 12 reliably encloses and stops the indication bar 2 from detaching from the slide channel 12. In addition, a stopper shoulder 124 is formed at the top end of the slide channel 12 to stop a shoulder section 23 of the indication bar 2, whereby the indication bar 2 is prevented from further passed into the slide channel 12.

The indication bar 2 includes a handle section 21 at front end of the indication bar 2 and an insertion section 211 pivotally disposed on inner side of the handle section 21. The indication bar 2 further includes a ruler 22 longitudinally connected with an end of the handle section 21 and a shoulder section 23 formed between the handle section 21 and the ruler 22. When the indication bar 2 is inserted into the slide channel 12 of the panel body 1, the shoulder section 23 of the indication bar 2 abuts against the stopper shoulder 124 of the slide channel 12 for stopping the indication bar 2 from further sliding into the slide channel 12. Therefore, the handle section 21 is exposed outside the slide channel 12 for a user to easily take out the indication bar 2.

The connecting member 3 includes a main body 31 formed with an insertion cavity 311 for the insertion member 211 of the indication bar 2 to insert therein, an outer guide board 32 extending from front end of the main body 31 toward the panel body 1 to lean against the outer edge of the front wall 123 of the slide channel 123, an inner guide board 33 extending from rear end of the main body toward the panel body 1 to lean against rear edges of the lateral walls 12*a*, 12*b* of the slide channel 12, and at least one resilient locating plate 34 one end of which is connected with the inner guide board 33, whereby when the outer and inner guide boards 33, 32 embrace the slide channel 12 with the connecting member 2 slidably disposed on the panel body 1, the free end 341 of the locating plate 34 resiliently abuts against and leans against the lateral walls 12*a*, 12*b* of the slide channel 12 so as to stably locate the connecting member 3 at a fixed position on the panel body 1 without slippage.

The resilient locating plates 34 can be radially disposed on the inner guide board 33. Alternatively, the locating plates 34 can be modified in shape and pattern to abut against the lateral walls 12*a*, 12*b* of the slide channel 12.

Figure 9:
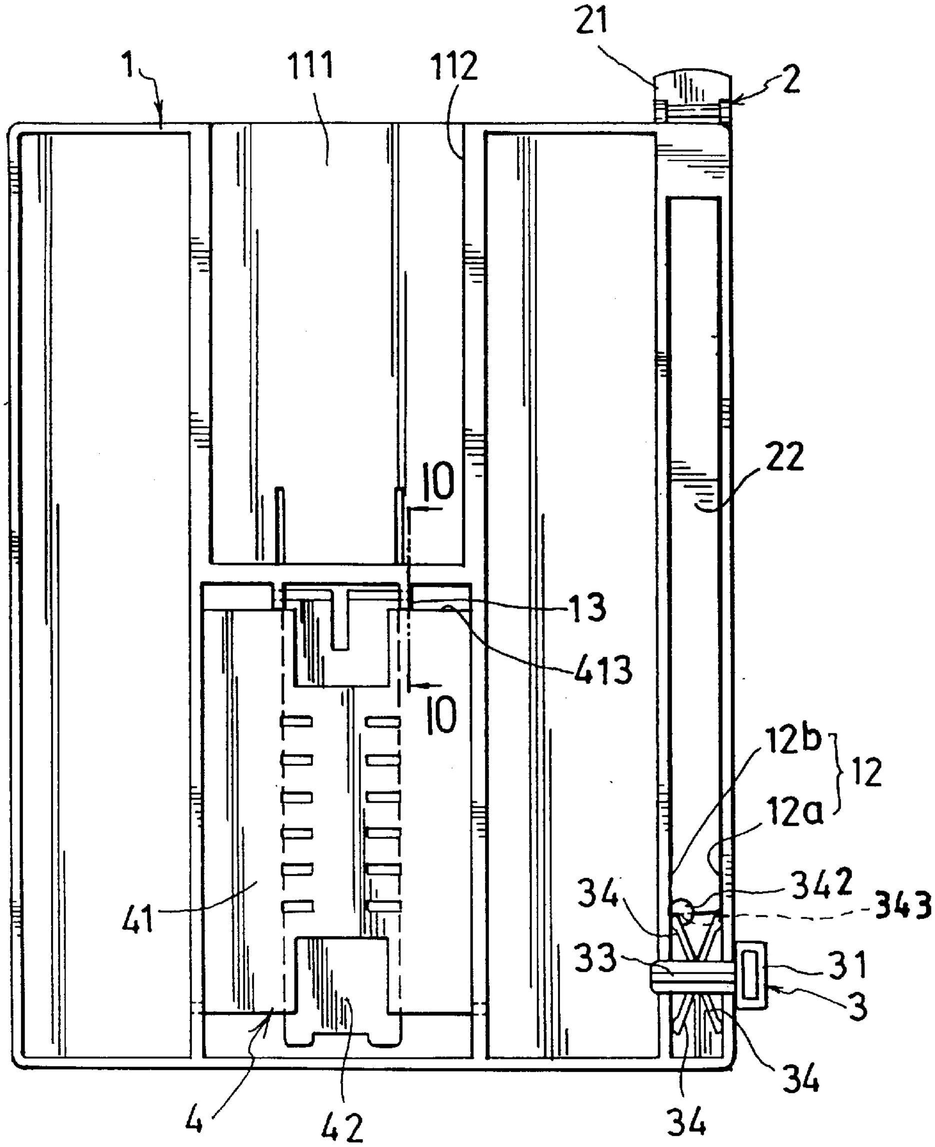
FIG. 9 is a rear view of the present invention in which the support device is folded.

Referring to FIGS. 3 and 9, the locating plates 34 include one (or two) upward directed locating plates the free end 341 of which is formed with a clamping section 342. The inner side of the clamping section 342 is formed with a notch 343. As shown in FIG. 9, after the ruler 22 is inserted into the opening 121 of the slide channel 12, the locating plate 34 is moved upward to insert the bottom end of the ruler 22 into the notch 343 to be clamped by the clamping section 342. Therefore, the bottom end of the ruler 22 will not detach out of the opening 121 of the slide channel 12.

Figure 6:
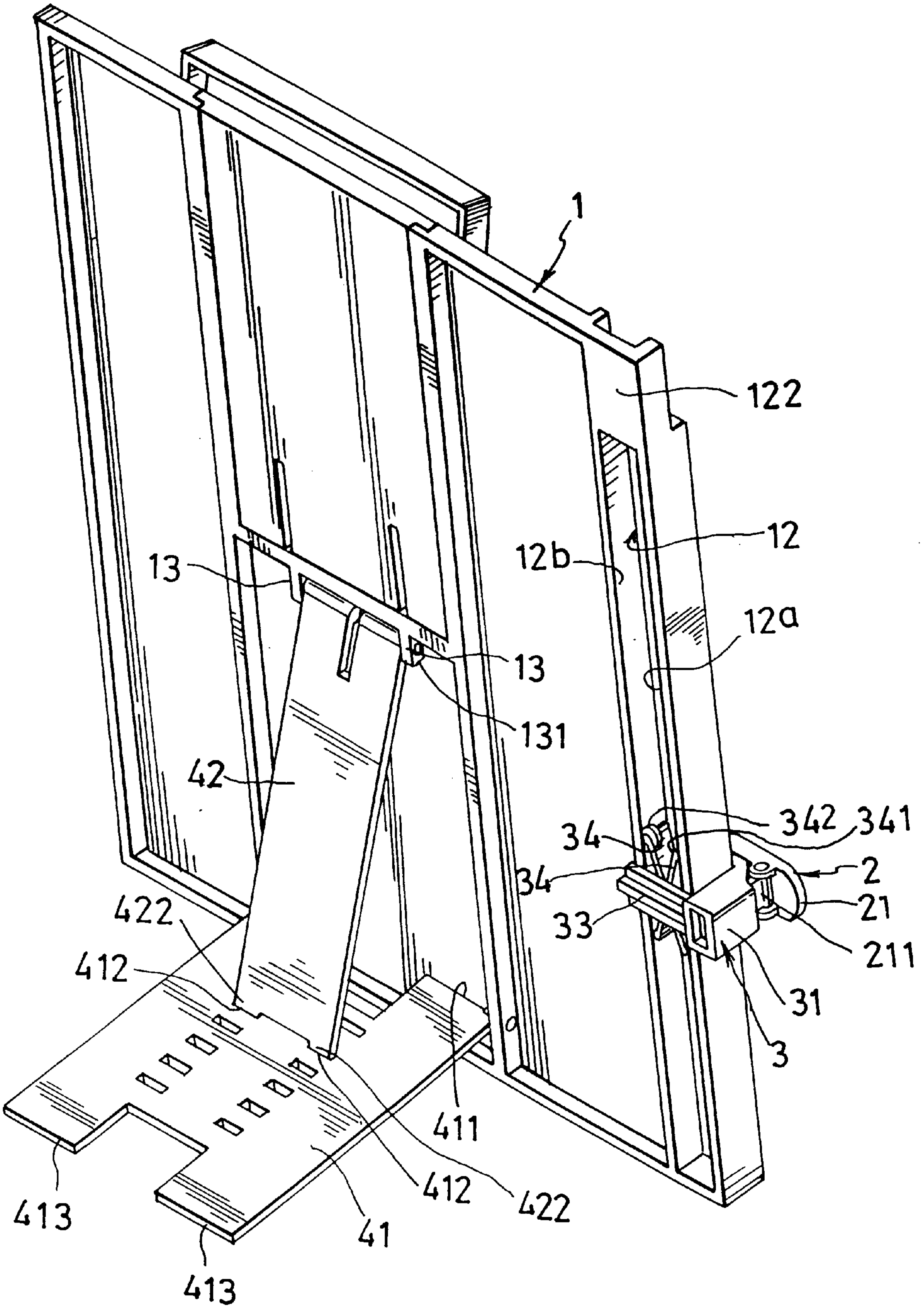
FIG. 6 shows that the panel body of the present invention is supported on a fixed article.
Figure 10:
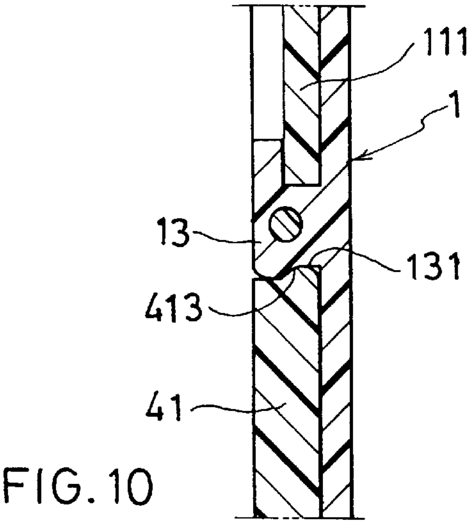
FIG. 10 is a sectional view taken along line 10—10 of FIG. 9.

As shown in FIGS. 6, 9 and 10, the back of the panel body 1 is disposed with a support device 4 for stably retaining the panel body 1 on a fixed article such as a desk face, whereby a user can read the paper clipped on the panel body 1. The support device 4 includes a support board 41 the front edge of which is pivotally connected with the bottom end of the back of the panel body 1. The support board 41 is formed with multiple serially arranged adjustment holes 412. The support device further includes an adjustment board 42 the front edge 421 of which is pivotally connected with a pair of lugs 13 of the back of the panel body 1. The bottom end of the adjustment board 42 is formed with at least one insertion section 422 for inserting into the adjustment holes 412 of the support board 41. Accordingly, the insertion section 422 is selectively inserted into at least one adjustment hole 412 of the support board 41 to form a tripod so as to rest the panel body 1 on the desk face by a certain angle for reading. In the case that the panel body 1 is used as a writing panel, the adjustment board 42 and the support board 41 are pivoted to attach to the back of the panel body 1 in a folded state with the rear edge 413 latched in a latch recess 131 formed on bottom edge of the lugs 13 as shown in FIGS. 9 and 10.

Figure 4:
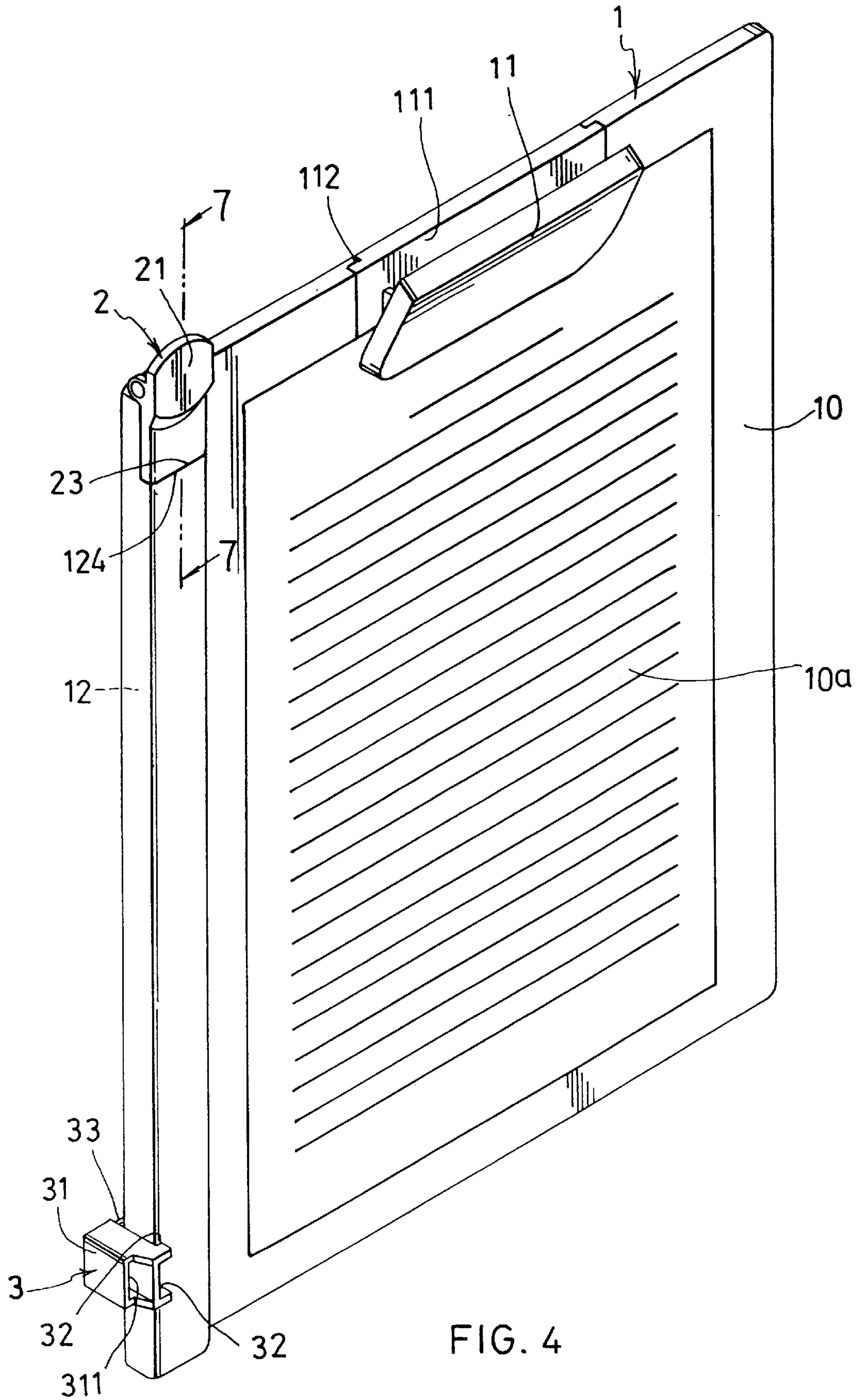
FIG. 4 shows that the indication bar is hidden in the slide channel of the panel body of the present invention, permitting the panel body to be used as a writing panel.
Figure 7:
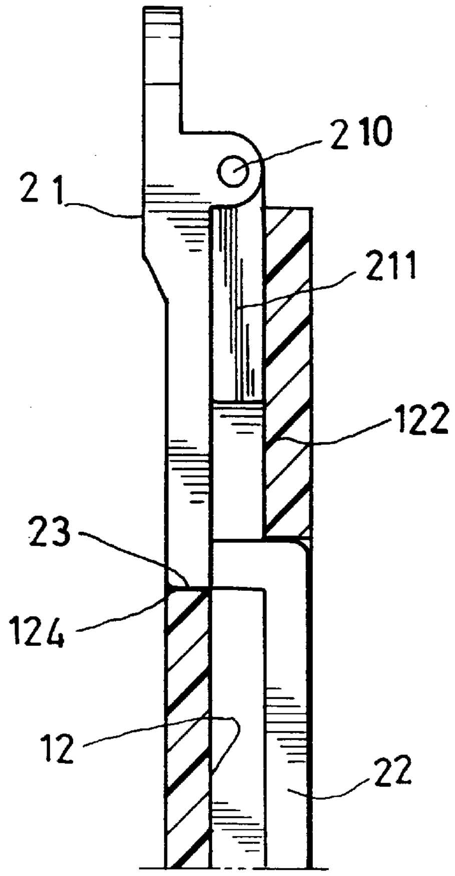
FIG. 7 is a sectional view taken along line 7—7 of FIG. 4.

As shown in FIGS. 4, 7 and 9, in use, the insertion plate 211 of the indication bar 2 is pivoted to attach to the handle section 21 and fitted into the slide channel 12 of the panel body 1, whereby the panel face 10 of the panel body 1 becomes a plane face without obstacle of the indication bar 2 and the paper 10*a* can be clipped by the paper clip 11 on the panel body 1, permitting a user to directly write thereon. Also, the indication bar 2 is hidden in the slide channel 12 so that the panel body 1 can be carried outdoors without missing or breaking the indication bar 2.

Figure 5:
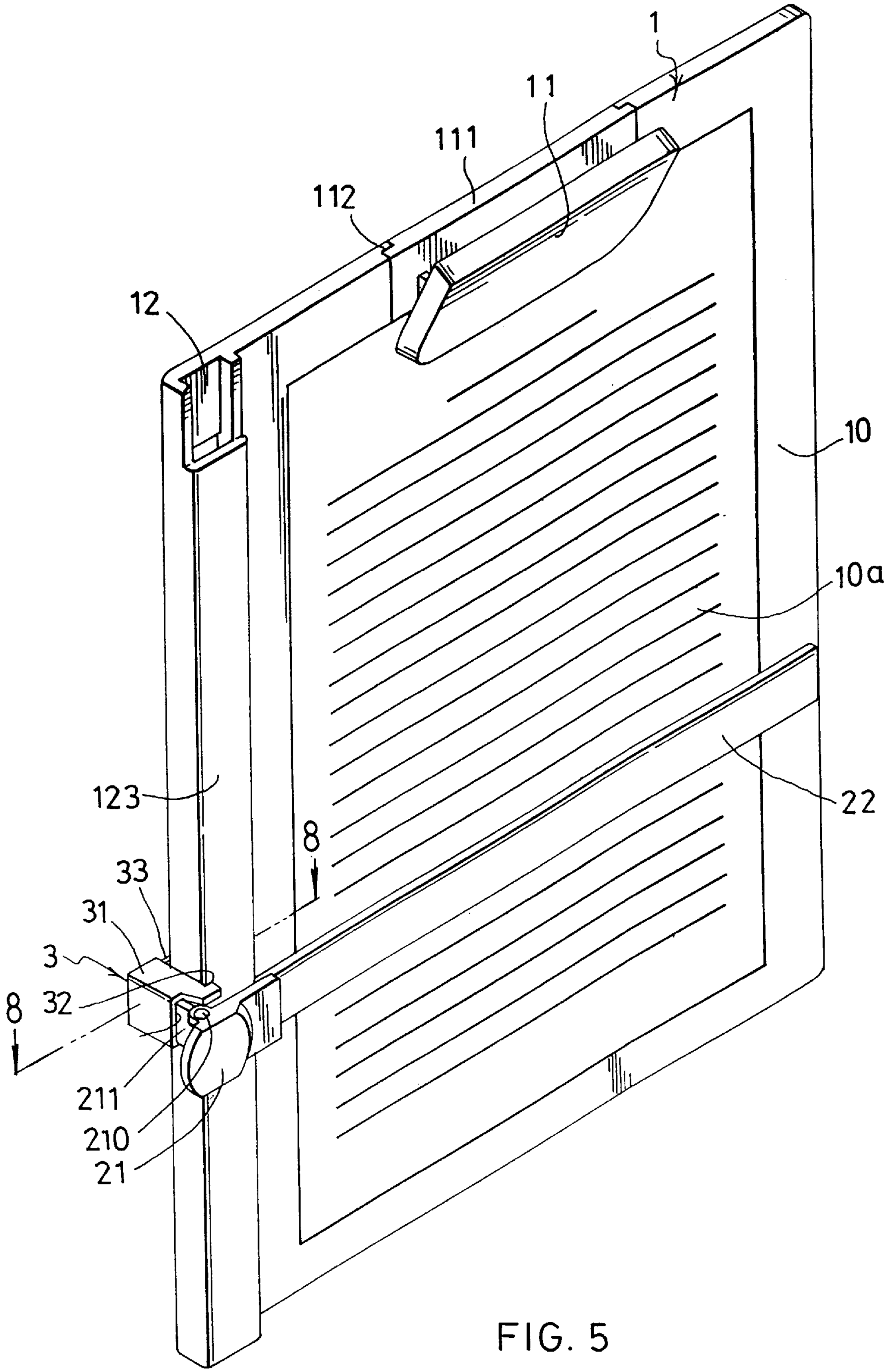
FIG. 5 shows that the indication bar is taken out of the slide channel and connected with the connecting member, enabling the panel body to be used as a reading panel.
Figure 8:
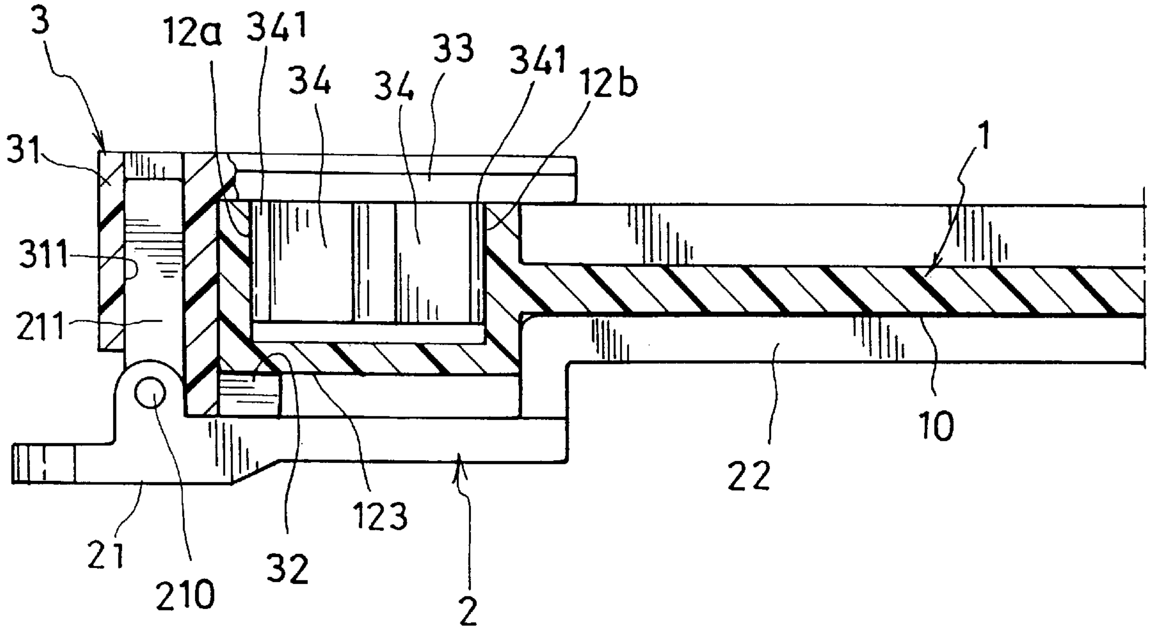
FIG. 8 is a sectional view taken along line 8—8 of FIG. 5.

As shown in FIGS. 5, 6 and 8, when serving as a reading panel, the indication bar 2 is taken out of the slide channel 12 and the insertion plate 211 of the handle section 21 is inserted into the insertion cavity 311 of the connecting member 3. Accordingly, the handle section 21 and the ruler 22 can be pivoted about the pivot shaft between the insertion plate 211 and the handle section 21, making the ruler 22 lean against the paper 10*a* clipped on the panel face to indicate the content of the paper. At this time, the support board 41 of the support device 4 can be pivoted downward with the insertion section 422 inserted in the adjustment holes 412 of the support board 41 to retain the panel body 1 on a fixed article such as a desk face by a certain angle for the user to read the paper. When it is desired to move the indication bar 2, the connecting member 3 can be directly moved up and down along the slide channel so as to adjust the position of the indication bar 2. Therefore, it is no more necessary to depress a resilient clip before moving the indication bar so that the operation of the indication bar is facilitated.

In addition, the connecting member 3 includes multiple resilient locating plates 34 for resiliently abutting against the lateral walls 12*a*, 12*b* of the slide channel 12, so that when moving the connecting member 3 up and down, not only the inner and outer guide boards 33, 32 can properly guide the connecting member 3 through the sliding path, but also after the connecting member 3 is released from the moving force, the resilient locating plates 34 can stably locate the connecting member 3 in the slide channel 12 without free sliding. Therefore, the connecting member 3 can be freely and quickly located at any position as desired.

According to the above arrangement, the present invention has the following advantages:

1. The indication bar can be hidden in the slide channel of the panel body to facilitate carriage of the panel body and provide a plane panel face for a user to write thereon. Alternatively, the indication bar can be connected with the connecting member and moved up and down along with the connecting member along the lateral edge of the panel body for indicating the content of the paper. Therefore, the present invention can serve as both a writing panel and a reading panel.

2. The resilient locating plates of the connecting member resiliently abut against the lateral walls of the slide channel, whereby the connecting member can be more smoothly slided without loosening and the indication bar can be kept in a horizontal position.

3. The resilient locating plates are able to stably locate the connecting member in the slide channel of the panel body so that the connecting member can be freely and quickly located at any position as desired.

It is to be understood that the above description and drawings are only used for illustrating one embodiment of the present invention, not intended to limit the scope thereof. Any variation and derivation from the above description and drawings should be included in the scope of the present invention.

What is claimed is:

1. A writing/reading panel with hidden indication bar, comprising:

- a panel body having a resilient paper clip pivotally disposed on upper side and a slide channel longitudinally disposed on a lateral side of the panel body;
- an indication bar snugly fitted in the slide channel and having a handle section at front end and an insertion plate pivotally connected with the handle section; and
- a connecting member vertically slidably disposed on two sides of the slide channel and formed with an insertion cavity for inserting the insertion plate of the indication bar therein, the connecting member having at least one resilient locating plate for resiliently abutting against lateral walls of the slide channel so as to locate the connecting member, whereby the indication bar can be fitted into the slide channel, permitting the panel body to be used as a writing panel or the indication bar can be connected with the connecting member to be moved up and down along with the connecting member for indicating the content of the paper clipped on the panel body.

2. A writing/reading panel as claimed in claim 1, wherein the slide channel has an opening for placing the indication bar therein, a stopper plate being transversely connected between two lateral walls of the slide channel at a top section thereof, the stopper plate together with a front wall of the slide channel reliably encloses and stops the indication bar from detaching from the slide channel.

3. A writing/reading panel as claimed in claim 1, wherein a stopper shoulder is formed at the top end of the slide channel to stop a shoulder section of the indication bar, whereby the indication bar is prevented from further sliding into the slide channel.

4. A writing/reading panel as claimed in claim 1, wherein the indication bar includes a handle section at front end of the indication bar and an insertion section pivotally disposed on inner side of the handle section and a ruler longitudinally connected with an end of the handle section and a shoulder section formed between the handle section and the ruler.

5. A writing/reading panel as claimed in claim 1, wherein the connecting member includes a main body formed with an insertion cavity for the insertion member of the indication bar to insert therein, an outer guide board extending from front end of the main body toward the panel body to lean against the outer edge of the front wall of the slide channel, an inner guide board extending from rear end of the main body toward the panel body to lean against rear edges of the lateral walls of the slide channel, and at least one resilient locating plate a fixed end of which is connected with the inner guide board and a free end of which resiliently abuts against and leans against the lateral walls of the slide channel so as to stably locate the connecting member.

6. A writing/reading panel as claimed in claim 5, wherein multiple resilient locating plates are connected with the inner guide board and the free ends of the resilient locating plates radially resiliently abut against the lateral walls of the slide channel.

7. A writing/reading panel as claimed in claim 6, wherein the free end of the locating plate is formed with a clamping section, an inner side of the clamping section being formed with a notch, whereby after the ruler is inserted into the opening of the slide channel, bottom end of the ruler is inserted into the notch and clamped by the clamping section, preventing the bottom end of the ruler from detaching out of the opening.

8. A writing/reading panel as claimed in claim 1, wherein the back of the panel body is disposed with a support device including a support board pivotally connected with the bottom end of the back of the panel body and formed with multiple serially arranged adjustment holes and an adjustment board pivotally connected with a pair of lugs of the back of the panel body, the bottom end of the adjustment board being formed with at least one insertion section for inserting into the adjustment holes of the support board, a latch recess being formed on bottom edge of the lugs for latching a rear edge of the support board.

* * * * *